2 Sheets--Sheet 1.

D. A. CALDWELL.
Grinding-Mills.
No. 145,786. Patented Dec. 23, 1873.

Witnesses.
E. Wolff.
Geo. W. Mabee

Inventor.
D. A. Caldwell
PER
Attorneys.

AM. PHOTO-LITHOGRAPHIC Co. N.Y. (OSBORNE'S PROCESS)

2 Sheets--Sheet 2.

D. A. CALDWELL.
Grinding-Mills.

No. 145,786. Patented Dec. 23, 1873.

Witnesses.
E. Wolff.
C. Sedgwick.

Inventor.
D. A. Caldwell
PER
Attorneys.

AM. PHOTO-LITHOGRAPHIC Co. N.Y. (OSBORNE'S PROCESS)

UNITED STATES PATENT OFFICE.

DAVID A. CALDWELL, OF JACKSONVILLE, ILLINOIS.

IMPROVEMENT IN GRINDING-MILLS.

Specification forming part of Letters Patent No. 145,786, dated December 23, 1873; application filed February 15, 1873.

*To all whom it may concern:*

Be it known that I, DAVID A. CALDWELL, of Jacksonville, in the county of Morgan and State of Illinois, have invented a new and Improved Grinding-Mill, of which the following is a specification:

My invention relates to an arrangement of devices for adjusting the runner-spindle vertically, and simultaneously indicating the degree of adjustment; and to the construction of a toothless driving-wheel, and its connection with a supplementary driving-gear, the former having springs arranged in suitable sockets, to prevent backlash, &c., as hereinafter de described.

Figure 1:
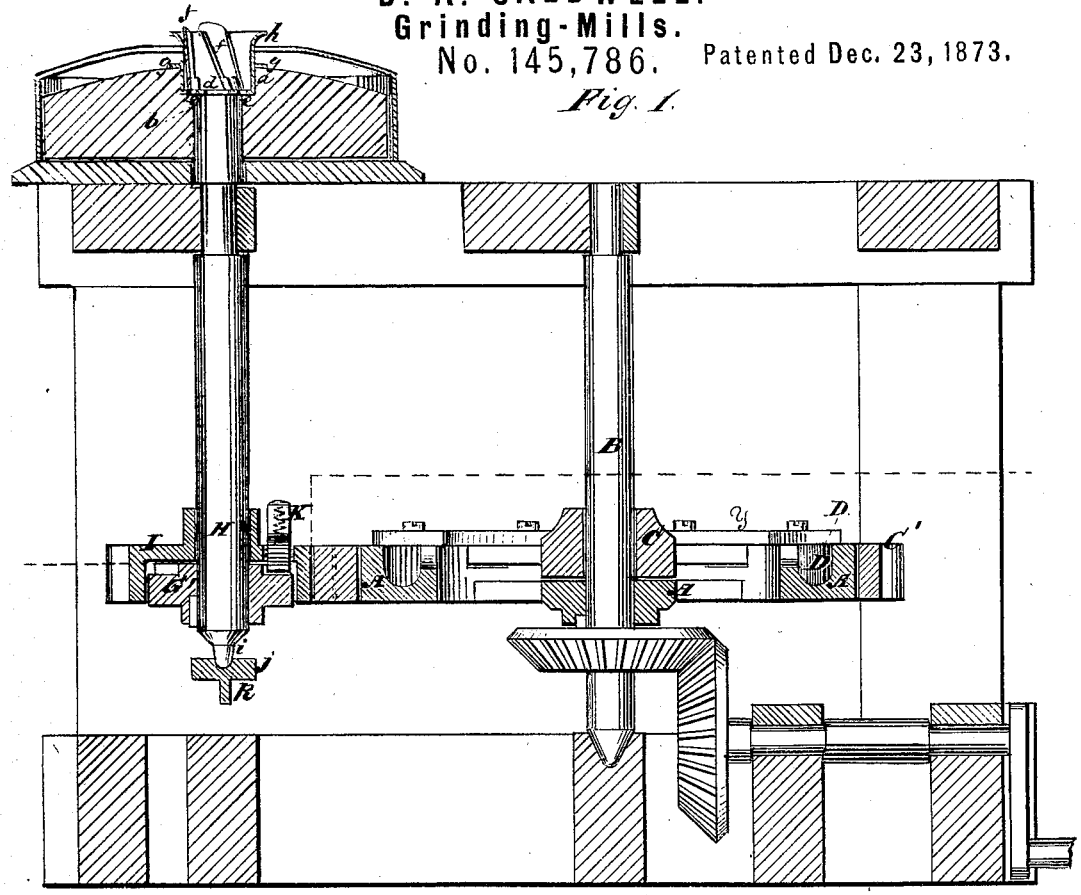
Figure 2:
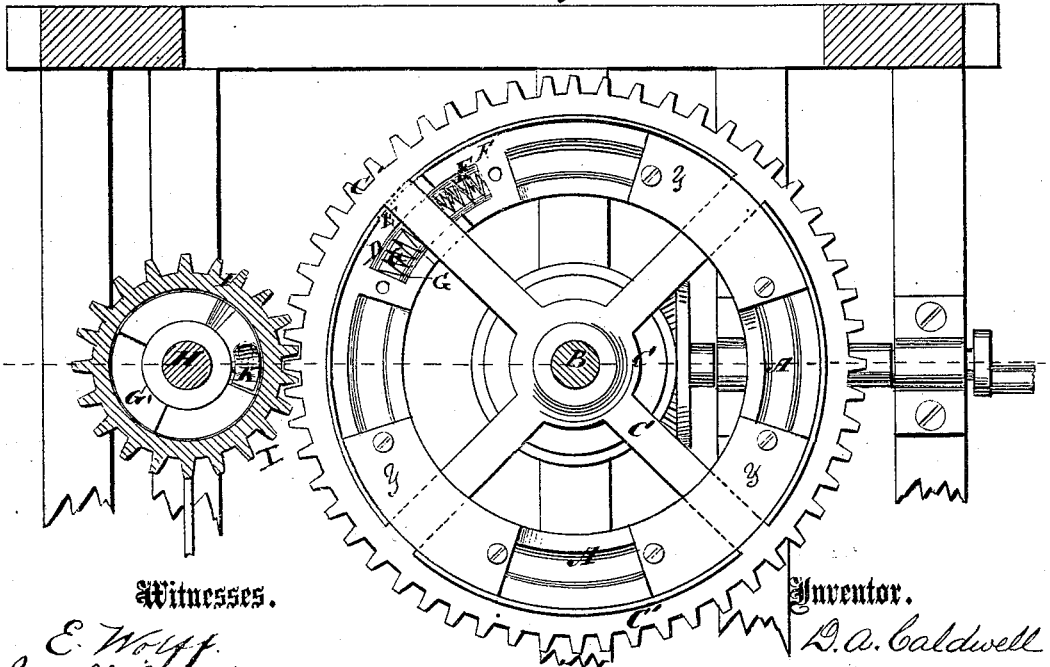
Figure 3:
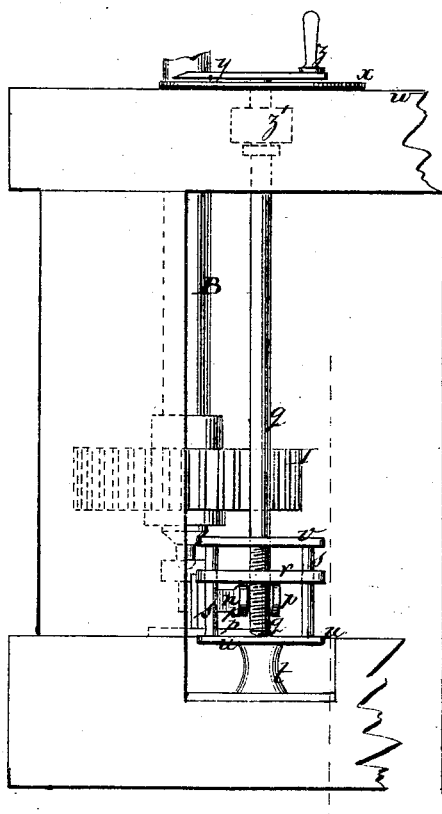
Figure 4:
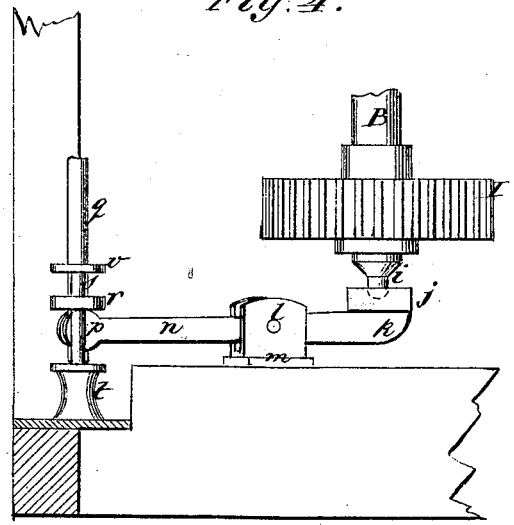

Figure 1 is a sectional elevation of the husk-frame, spur-wheel, pinion, the stones, and ventilating apparatus, on line $x\ x$ of Fig. 2. Fig. 2 is a horizontal section on the line $y\ y$. Figs. 3 and 4 are partial side elevations, showing the ventilating apparatus.

Similar letters of reference indicate corresponding parts.

C is a spur-gear, of ordinary construction, arranged loose on the shaft B, with its toothed rim C' meshing with pinion I on the runner-spindle H. The supplementary driving-wheel A is placed under and supports the gear C, being itself fast on the same shaft. It has radial slots or notches in the upwardly-projecting flange formed around its periphery, to receive the arms of gear C; and sockets are formed in the opposite sides or walls of said slots, to receive springs F and G, which bear against the opposite sides of the arms of the wheel. The springs F are so arranged, as to strength and length, that one only will come in contact with wheel C when driving one run of stone; but, when driving two, the longest one will contract enough for the shorter one to come into action, thus making the elastic and yielding capacity alike applicable in the use of part or all of the power. To secure the springs in place, and connect the two wheels together in a requisite manner, I apply plates Y, the same being bolted at their ends to the wheel A, and covering thus the sockets or recesses D, and confining the arms of wheel C in the slots of wheel A. G' is the ratchet-clutch, keyed fast to the spindle, its ratchet-face being on the upper side. I is the pinion, resting on the upper side of said ratchet, and K is the spring-pawl, for locking the pinion with it, and for slipping over the notches, to allow the stone to continue to run by its momentum after the steam-engine stops, or in case the engine runs backward. The stone-ventilator consists of a short tube, $a$, fitting in an enlarged portion of the eye of the stone. Said tube has a bottom, $b$, with a hole, $d$, for the feed-tube, and ventilating-holes $e$, above which are air-conducting tubes $f$, open in the sides, fronting in the direction the stone runs, to compress the air and force it down into the eye below. Said tubes expand in the upward direction, to present a large surface to the air, and they slope backward to receive the air at right angles, or thereabout, as the currents descend over the top of the tube $a$ to them. Said tube $a$ has a flange, $g$, which rests on the top of the stem, to prevent the warm air from drawing from under the curb, down between the tube and the wall of the eye of the stone; and it has an oval flange, $h$, at the top, to insure the receiving of the cool air from above the curb. The spindle-step $i$ is mounted in a steel box or cup, $j$, which is fixed on the end of the short arm $k$ of a lever, pivoted at $l$ on a pedestal, $m$, which is to be supported on the sill of the husk-frame, or, preferably, on an independent foundation. The long arm $n$, which is forked or notched, as shown at $p$, extends to and embraces the lower part of a temper-screw, $q$, under a follower, $r$, working up and down on the guide-rods $s$, and operated by the screw, which is stepped in a pedestal, $t$, which supports the said rods by a bar, $u$, the upper ends being connected to and stayed by a bar, $v$, through which the temper-screw passes, but not screwing in it. The rod $q$ extends up through the stone floor $w$ and a dial-plate, $x$, thereon, and has a pointer, $y$, and hand crank or wheel $z$, the one for turning it, and the other for indicating on the dial the extent of the movement of the screw. This screw is provided with a collar, $z'$, at its bearings in the stone floor, so that it cannot move endwise, by which, when turned, it works the follower $r$ up or down, according to which way it is turned, and thereby causes the vertical adjustment of the stone.

It will be seen that the prevention of endwise movement of the screw $g$ is indispensable to use of the dial and pointer, and to the action of the bar $r$ on the forked end of lever $n$.

I do not claim a driving-wheel having springs arranged to act upon another toothed wheel; but

Having thus described my invention, I claim as new and desire to secure by Letters Patent—

1. The crank-arm and pointer moving over a dial, $x$, the screw $g$ having collar $z'$ for preventing endwise motion, the frame $u$ $v$ and movable bar $r$, and the lever $n$ having a forked end and supporting the runner-spindle, all combined and arranged as shown and described, to operate as specified.

2. The combination, with the gear-wheel C, loose on the shaft B, of the fast wheel A having a slotted peripheral flange with sockets D, the springs F G, and cap-plates, all as shown and described, whereby the wheel A fits within and under wheel C, and is attached thereto, as specified.

DAVID A. CALDWELL.

Witnesses:
A. C. WADSWORTH,
S. SUTTON.